(12) United States Patent
Wiedmeyer et al.

(10) Patent No.: US 8,956,524 B2
(45) Date of Patent: Feb. 17, 2015

(54) MODULAR ANODE ASSEMBLIES AND METHODS OF USING THE SAME FOR ELECTROCHEMICAL REDUCTION

(75) Inventors: Stanley G. Wiedmeyer, Glen Ellyn, IL (US); Laurel A. Barnes, Chicago, IL (US); Mark A. Williamson, Naperville, IL (US); James L. Willit, Batavia, IL (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 942 days.

(21) Appl. No.: 12/977,916

(22) Filed: Dec. 23, 2010

(65) Prior Publication Data

US 2012/0160704 A1 Jun. 28, 2012

(51) Int. Cl.
| C25C 3/00 | (2006.01) |
| C25C 7/00 | (2006.01) |
| G21C 19/48 | (2006.01) |
| G21F 9/30 | (2006.01) |

(52) U.S. Cl.
CPC .............. *C25C 7/005* (2013.01); *G21C 19/48* (2013.01); *G21F 9/30* (2013.01)
USPC .......................... 205/354; 204/244; 204/286.1

(58) Field of Classification Search
USPC ................................ 205/354; 204/274, 286.1
See application file for complete search history.

(56) References Cited

U.S. PATENT DOCUMENTS

| 422,139 | A | 2/1890 | Maxon | |
| 658,891 | A * | 10/1900 | Carmichael | 204/288 |
| 2,089,738 | A | 8/1935 | Elmer | |
| 2,194,444 | A | 3/1940 | Hulse et al. | |
| 2,766,198 | A * | 10/1956 | Carosalla | 205/573 |
| 2,800,219 | A | 7/1957 | Carroll | |
| 2,913,380 | A | 11/1959 | Gullett | |

(Continued)

FOREIGN PATENT DOCUMENTS

| AU | 622994 | 4/1992 |
| CA | 1 142 123 | 3/1983 |

(Continued)

OTHER PUBLICATIONS

International Search Report dated Jan. 20, 2012 issued in PCT/US2011/053589.

(Continued)

*Primary Examiner* — Bryan D. Ripa
(74) *Attorney, Agent, or Firm* — Harness, Dickey & Pierce, P.L.C.

(57) ABSTRACT

Modular anode assemblies are used in electrolytic oxide reduction systems for scalable reduced metal production via electrolysis. Assemblies include a channel frame connected to several anode rods extending into an electrolyte. An electrical system powers the rods while being insulated from the channel frame. A cooling system removes heat from anode rods and the electrical system. An anode guard attaches to the channel frame to prevent accidental electrocution or damage during handling or repositioning. Each anode rod may be divided into upper and lower sections to permit easy repair and swapping out of lower sections. The modular assemblies may have standardized components to permit placement at multiple points within a reducing system. Example methods may operate an electrolytic oxide reduction system by positioning the modular anode assemblies in the reduction system and applying electrical power to the plurality of anode assemblies.

20 Claims, 4 Drawing Sheets

(56) References Cited

U.S. PATENT DOCUMENTS

| | | | |
|---|---|---|---|
| 2,967,142 A * | 1/1961 | Oliver | 204/288 |
| 3,531,269 A | 9/1970 | Grady | |
| 3,562,131 A | 2/1971 | Jasberg | |
| 3,645,708 A | 2/1972 | Grady | |
| 3,697,404 A | 10/1972 | Paige | |
| 3,972,794 A | 8/1976 | Lamm | |
| 4,013,329 A | 3/1977 | Hugin | |
| 4,023,673 A | 5/1977 | Hansen | |
| 4,025,400 A | 5/1977 | Cook et al. | |
| 4,039,403 A | 8/1977 | Astley et al. | |
| 4,073,703 A * | 2/1978 | Kinosz et al. | 205/404 |
| 4,148,392 A | 4/1979 | Larson et al. | |
| 4,203,531 A | 5/1980 | Reichel et al. | |
| 4,326,937 A | 4/1982 | Neumeier et al. | |
| 4,437,968 A | 3/1984 | Elliott, Jr. | |
| 4,492,621 A | 1/1985 | Stubb | |
| 4,608,135 A * | 8/1986 | Brown | 205/396 |
| 4,668,353 A | 5/1987 | Smith et al. | |
| 4,851,098 A | 7/1989 | Kimura et al. | |
| 4,863,580 A | 9/1989 | Epner | |
| 4,880,506 A | 11/1989 | Ackerman et al. | |
| 4,946,026 A | 8/1990 | Rickman | |
| 5,015,342 A | 5/1991 | Ginatta et al. | |
| 5,415,742 A | 5/1995 | La Camera et al. | |
| 5,454,914 A | 10/1995 | Gay | |
| 5,531,868 A | 7/1996 | Miller et al. | |
| 5,582,706 A | 12/1996 | Grantham et al. | |
| 5,689,538 A | 11/1997 | Bonhomme | |
| 5,770,034 A | 6/1998 | Jansen et al. | |
| 5,855,749 A | 1/1999 | Kohut et al. | |
| 5,935,394 A | 8/1999 | Sivilotti et al. | |
| 6,142,291 A | 11/2000 | Schulze et al. | |
| 6,540,902 B1 | 4/2003 | Redey et al. | |
| 6,689,260 B1 | 2/2004 | Ahluwalia et al. | |
| 6,821,405 B1 | 11/2004 | Marttila | |
| 6,866,768 B2 | 3/2005 | Bradford et al. | |
| 7,011,736 B1 | 3/2006 | Miller et al. | |
| 7,090,760 B2 | 8/2006 | Seo et al. | |
| 7,097,747 B1 | 8/2006 | Herceg et al. | |
| 7,449,635 B2 | 11/2008 | Wiant | |
| 7,563,982 B2 | 7/2009 | Kimmel | |
| 7,638,026 B1 | 12/2009 | Willit et al. | |
| 7,799,185 B1 | 9/2010 | Willit | |
| 8,248,760 B2 | 8/2012 | Abrahamsen et al. | |
| 2004/0007466 A1 | 1/2004 | Seo et al. | |
| 2004/0134785 A1 | 7/2004 | Gay et al. | |
| 2004/0168932 A1 | 9/2004 | Wang | |
| 2005/0067291 A1 | 3/2005 | Haiki et al. | |
| 2005/0205428 A1 | 9/2005 | Dees et al. | |
| 2005/0233634 A1 | 10/2005 | Kollmann | |
| 2006/0067291 A1 | 3/2006 | Nakata | |
| 2006/0091017 A1 | 5/2006 | Lam | |
| 2006/0096853 A1 | 5/2006 | King | |
| 2007/0082551 A1 | 4/2007 | Oesterhaus | |
| 2007/0295601 A1 | 12/2007 | Bayer | |
| 2008/0128270 A1 | 6/2008 | Hiraiwa et al. | |
| 2008/0142374 A1 | 6/2008 | Iwama et al. | |
| 2008/0152270 A1 | 6/2008 | Engesser et al. | |
| 2009/0050483 A1 | 2/2009 | Li | |
| 2009/0152124 A1 | 6/2009 | Ashford et al. | |
| 2010/0276259 A1 | 11/2010 | Phalen | |
| 2011/0100328 A1 | 5/2011 | Paul | |
| 2011/0180409 A1 | 7/2011 | Willit et al. | |

FOREIGN PATENT DOCUMENTS

| | | |
|---|---|---|
| DE | 26 000 344 A1 | 7/1977 |
| DE | 3837572 | 5/1989 |
| DE | 19845258 | 3/2000 |
| EP | 0 286 092 | 10/1988 |
| EP | 0 736 929 | 10/1996 |
| EP | 2224542 | 9/2010 |
| GB | 284678 | * 11/1928 |
| GB | 506590 | 5/1939 |
| GB | 516775 | 1/1940 |
| GE | 284 678 A | 11/1928 |
| JP | H05279887 | 10/1993 |
| JP | H0972991 | 3/1997 |
| JP | 2006-308442 | 11/2006 |
| WO | WO 02/066709 | 8/2002 |
| WO | WO 2004/018737 | 3/2004 |
| WO | WO 2004/031453 | 4/2004 |
| WO | WO 2005/035404 | 4/2005 |
| WO | WO 2006/007863 | 1/2006 |
| WO | WO 2009/062005 | 5/2009 |
| WO | WO 2010/080761 | 7/2010 |

OTHER PUBLICATIONS

International Search Report dated Jan. 30, 2012 issued in PCT/US2011/053878.

International Search Report dated May 11, 2012 issued in PCT/US2011/053871.

Steven D. Herrman, et al., "Electrolytic Reduction of Spent Oxide Fuel—Bench-Scale Test Results", Global 2005, INL/CON-05-00304, Paper No. 488, Oct. 2005.

International Search Report and Written Opinion issued in International Patent Application No. PCT/US2012/058663, issued Aug. 12, 2013.

International Search Report and Written Opinion issued in International Patent Application No. PCT/US2012/058531, issued Aug. 2, 2013.

European Search Report issued in European Patent Application No. 13163951.0, issued Aug. 29, 2013.

International Search Report issued in connection with PCT/US2011/053872, Feb. 6, 2012.

Journeau, et al., "Physico-chemical analyses and solidification path reconstruction of multi-component oxidic spread melts." Materials Science and Engineering A. vol. 299. Feb. 15, 2001. pp. 249-266.

International Atomic Energy Agency (IAEA). "Storage and Disposal of Spent Fuel and High Level Radioactive Waste". Additional paper to the IAEA's Nuclear Technology Review (2006), pp. 1-11.

Morss, et al., "Cerium, uranium, and plutonium behavior in glass-bonded sodalite, a ceramic nuclear waste form." Journal of Alloys and Compounds. vols. 303-304. May 24, 2000. pp. 42-48.

Abraham, et al., "Metal waste forms from treatment of EBR-II spent fuel." Argonne National Laboratory. Presented at Spectrum '98 Conference. Sep. 18, 1998, pp. 1-7.

Jeong, et al., "Electrolytic production of metallic Uranium from $U_3O_8$ in a 20-kg batch scale reactor", Journal of Radioanalytical and Nuclear Chemistry, vol. 268, No. 2, pp. 349-356 (2006).

"Proceedings of GLOBAL 2005", Tsukuba, Japan, Oct. 9-13, 2005, Paper No. 488.

International Search Report and Written Opinion issued in International Patent Application No. PCT/US2012/058664, mailed Jul. 8, 2013.

International Search Report and Written Opinion issued in International Patent Application No. PCT/US2012/058659, mailed Jul. 5, 2013.

International Search Report and Written Opinion issued in International Patent Application No. PCT/US2012/058661, mailed Jul. 25, 2013.

Figueroa, J. et al., "GTRI Progress in Developing Pyrochemical Processes for Recovery of Fabrication Scrap and Reprocessing of Monolithic U-MO Fuel", RERTR 2011—International Meeting on Reduced Enrichment for Research and Test Reactors, Oct. 23, 2011, XP055071122.

* cited by examiner

MODULAR ANODE ASSEMBLIES AND METHODS OF USING THE SAME FOR ELECTROCHEMICAL REDUCTION

GOVERNMENT SUPPORT

This invention was made with Government support under contract number DE-ACO2-06CH11357, awarded by the U.S. Department of Energy. The Government has certain rights in the invention.

BACKGROUND

Single and multiple-step electrochemical processes are useable to reduce metal-oxides to their corresponding metallic (unoxidized) state. Such processes are conventionally used to recover high purity metal, metals from an impure feed, and/or extract metals from their metal-oxide ores.

Multiple-step processes conventionally dissolve metal or ore into an electrolyte followed by an electrolytic decomposition or selective electro-transport step to recover unoxidized metal. For example, in the extraction of uranium from spent nuclear oxide fuels, a chemical reduction of the uranium oxide is performed at 650° C., using a reductant such as Li dissolved in molten LiCl, so as to produce uranium and $Li_2O$. The solution is then subjected to electro-winning, where dissolved $Li_2O$ in the molten LiCl is electrolytically decomposed to regenerate Li. The uranium metal is prepared for further use, such as nuclear fuel in commercial nuclear reactors.

Single-step processes generally immerse a metal oxide in molten electrolyte, chosen to be compatible with the metal oxide, together with a cathode and anode. The cathode electrically contacts the metal oxide and, by charging the anode and cathode (and the metal oxide via the cathode), the metal oxide is reduced through electrolytic conversion and ion exchange through the molten electrolyte.

Single-step processes generally use fewer components and/or steps in handling and transfer of molten salts and metals, limit amounts of free-floating or excess reductant metal, have improved process control, and are compatible with a variety of metal oxides in various starting states/mixtures with higher-purity results compared to multi-step processes.

SUMMARY

Example embodiments include modular anode assemblies and electrolytic oxide reduction systems using such modular assemblies. Each assembly may include a channel frame connected to several anode rods that extend into an electrolyte in a reduction system. The rods may be powered by an electrical system that, with the rods, is insulated from the channel frame. The electrical systems may be resilient in high operating temperatures by including a slip joint that allows for thermal expansion without damage. A cooling system removes heat from the anode rod and the electrical system, by, for example, blowing an active, inert cooling gas onto the components. An anode guard may be fastened to the channel frame to prevent accidental electrocution or damage to assembly components during handling and repositioning of the modular assemblies. Each anode rod may be divided into upper and lower sections to permit easy repair and swapping out of lower sections that contact a potentially corrosive electrolyte. The modular assemblies may have standardized electrical and gas source/drain contacts to permit placement at multiple points within a reducing system.

Example methods may operate an electrolytic oxide reduction system by positioning the modular anode assemblies in the reduction system and applying electrical power to the plurality of anode assemblies through the electrical system in the assemblies so as to charge the anode rods. Because the anode rods extend into an electrolyte contacting the target oxide and cathode, the metal oxide may be reduced to its metallic form. The electrolyte may be fluidized by melting or dissolving so that the anode rod in each of the modular anode rod assemblies may extend into the electrolyte. The cooling system may be operated during the power application to remove heat from the anode rod and the electrical system when connected to a gas source and a gas drain via the cooling system.

DETAILED DESCRIPTION

Figure 1:
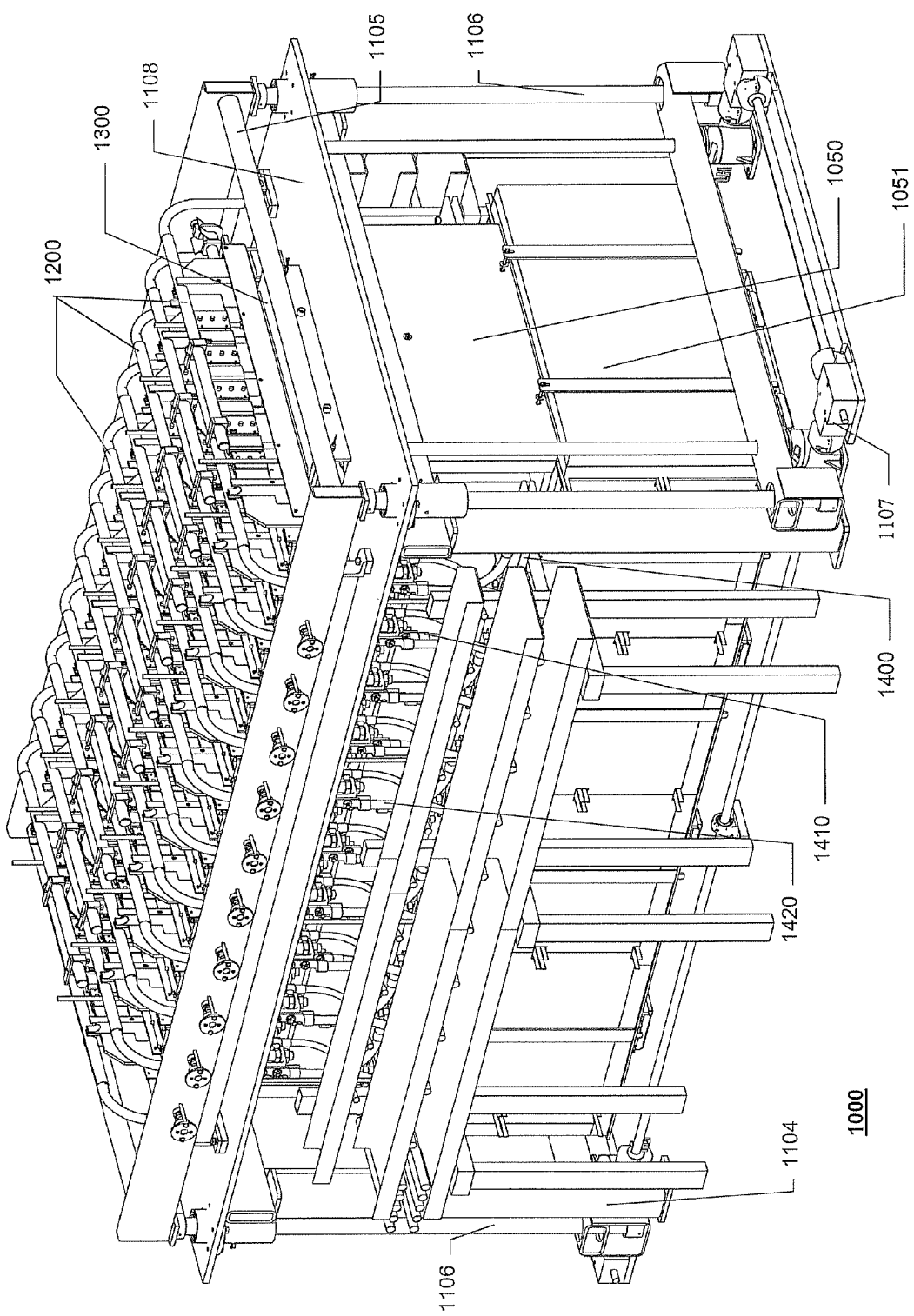
FIG. 1 is an illustration of an example embodiment electrolytic oxide reduction system.

Hereinafter, example embodiments will be described in detail with reference to the attached drawings. However, specific structural and functional details disclosed herein are merely representative for purposes of describing example embodiments. The example embodiments may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

As used herein, the singular forms "a", "an" and "the" are intended to include the plural forms as well, unless the language explicitly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures or described in the specification. For example, two figures or steps shown in succession may in fact be executed in series and concurrently or may sometimes be executed in the reverse order or repetitively, depending upon the functionality/acts involved.

The inventors have recognized a problem in existing single-step electrolytic reduction processes that the known processes cannot generate large amounts of reduced, metallic products on a commercial or flexible scale, at least in part because of limited, static cathode size and configuration. Single step electrolytic reduction processes may further lack flexibility in configuration, such as part regularity and replaceability, and in operating parameters, such as power level, operating temperature, working electrolyte, etc. Example systems and methods described below uniquely address these and other problems, discussed below or not.

Example Embodiment Electrolytic Oxide Reduction Systems

FIG. 1 is an illustration of an example embodiment electrolytic oxide reduction system (EORS) 1000. Although aspects of example embodiment EORS 1000 are described below and useable with related example embodiment components, EORS 1000 is further described in the following co-pending applications:

| Ser. No. | Filing Date |
| --- | --- |
| 12/977,791 | Herewith |
| 12/977,839 | Herewith |
| 12/978,005 | Herewith |
| 12/978,027 | Herewith |

The disclosures of the above-listed co-pending applications are incorporated by reference herein in their entirety.

As shown in FIG. 1, example embodiment EORS 1000 includes several modular components that permit electrolytic reduction of several different types of metal-oxides on a flexible or commercial scale basis. Example embodiment EORS 1000 includes an electrolyte container 1050 in contact with or otherwise heated by a heater 1051, if required to melt and/or dissolve an electrolyte in container 1050. Electrolyte container 1050 is filled with an appropriate electrolyte, such as a halide salt or salt containing a soluble oxide that provides mobile oxide ions, chosen based on the type of material to be reduced. For example, $CaCl_2$ and $CaO$, or $CaF_2$ and $CaO$, or some other Ca-based electrolyte, or a lithium-based electrolyte mixture such as $LiCl$ and $Li_2O$, may be used in reducing rare-earth oxides, or actinide oxides such as uranium or plutonium oxides, or complex oxides such as spent nuclear fuel. The electrolyte may further be chosen based on its melting point. For example, an electrolyte salt mixture of $LiCl$ or $LiF$ and $Li_2O$ may become molten at around 610° C. at standard pressure, whereas a $CaCl_2$ and $CaO$ mixture may require an operating temperature of approximately 850° C. Concentrations of the dissolved oxide species may be controlled during reduction by additions of soluble oxides or chlorides by electrochemical or other means.

EORS 1000 may include several supporting and structural members to contain, frame, and otherwise support and structure other components. For example, one or more lateral supports 1104 may extend up to and support a top plate 1108, which may include an opening (not shown) above electrolyte container 1050 so as to permit access to the same. Top plate 1108 may be further supported and/or isolated by a glove box (not shown) connecting to and around top plate 1108. Several standardized electrical contacts 1480 (FIG. 2) and cooling sources/gas exhausts may be provided on or near top plate 1108 to permit anode and cathode components to be supported by and operable through EORS 1000 at modular positions. A lift basket system, including a lift bar 1105 and/or guide rods 1106 may connect to and/or suspend cathode assemblies 1300 that extend down into the molten electrolyte in electrolyte container 1050. Such a lift basket system may permit selective lifting or other manipulation of cathode assemblies 1300 without moving the remainder of EORS 1000 and related components.

In FIG. 1, EORS 1000 is shown with several cathode assemblies 1300 alternating with several anode assemblies 1200 supported by various support elements and extending into electrolyte container 1050. The assemblies may further be powered or cooled through standardized connections to corresponding sources in EORS 1000. Although ten cathode assemblies 1300 and eleven anode assemblies 1200 are shown in FIG. 1, any number of anode assemblies 1200 and cathode assemblies 1300 may be used in EORS 1000, depending on energy resources, amount of material to be reduced, desired amount of metal to be produced, etc. That is, individual cathode assemblies 1300 and/or anode assemblies 1200 may be added or removed so as to provide a flexible, and potentially large, commercial-scale, electrolytic reduction system. In this way, through the modular design of example embodiment EORS 1000, anode assemblies 1200 and cathode assemblies 1300, example embodiments may better satisfy material production requirements and energy consumption limits in a fast, simplified single-stage reduction operation. The modular design may further enable quick repair and standardized fabrication of example embodiments, lower manufacturing and refurbishing costs and time consumption.

Figure 2:
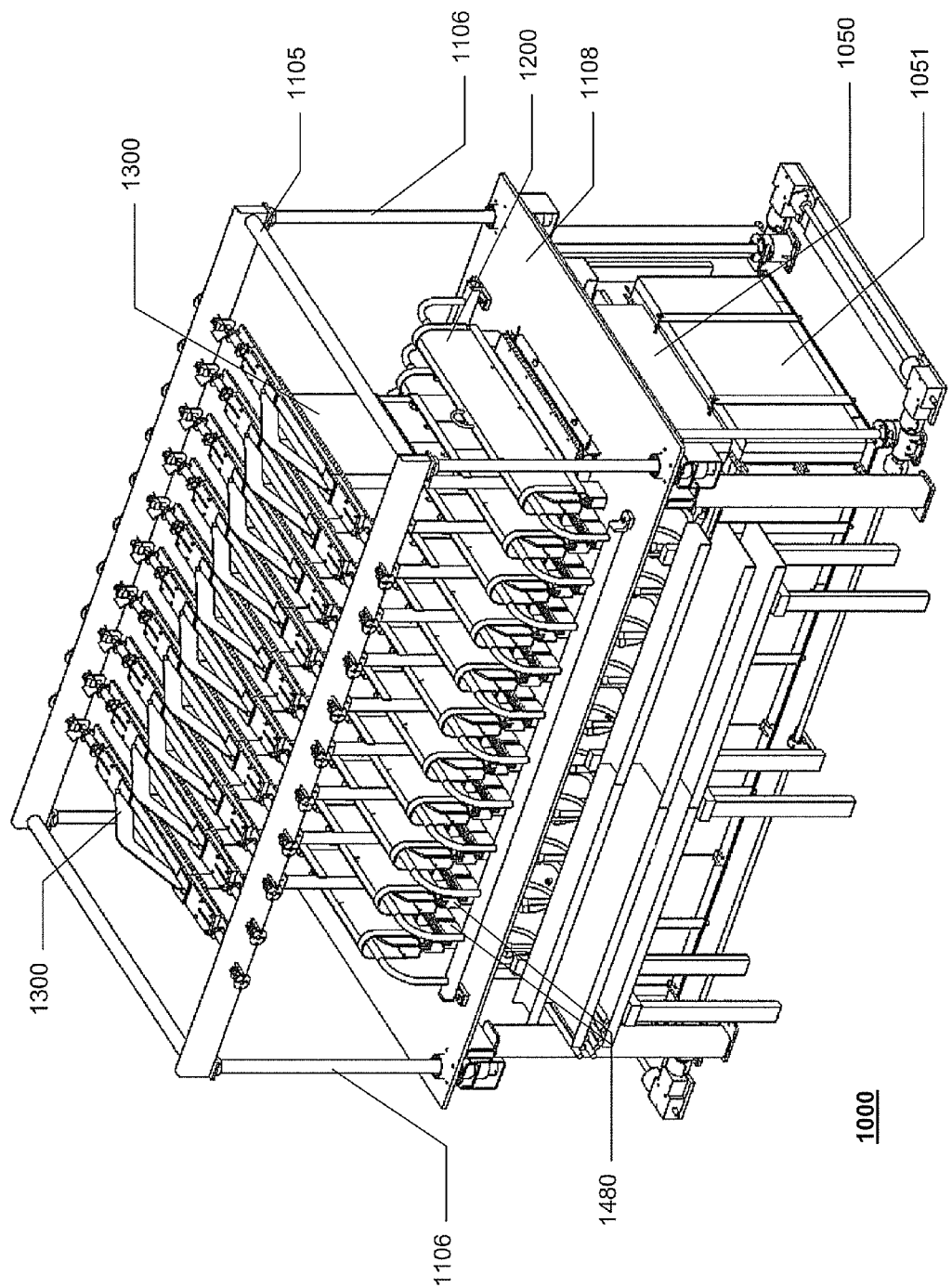
FIG. 2 is another illustration of the example embodiment electrolytic oxide reduction system of FIG. 1 in an alternate configuration.

FIG. 2 is an illustration of EORS 1000 in an alternate configuration, with basket lifting system including lift bar 1105 and guide rods 1106 raised so as to selectively lift only modular cathode assemblies 1300 out of electrolyte container 1050 for access, permitting loading or unloading of reactant metals oxides or produced reduced metals from cathode assemblies 1300. In the configuration of FIG. 2, several modular electrical contacts 1480 are shown aligned at modular positions about the opening in top plate 1108. For example, electrical contacts 1480 may be knife-edge contacts that permit several different alignments and positions of modular cathode assemblies 1300 and/or anode assemblies 1200 within EORS 1000.

As shown in FIG. 1, a power delivery system including a bus bar 1400, anode power cable 1410, and/or cathode power cable 1420 may provide independent electric charge to anode assemblies 1200 and/or cathode assemblies 1300, through electrical contacts (not shown). During operation, electrolyte in electrolyte container 1050 may be liquefied by heating and/or dissolving or otherwise providing a liquid electrolyte material compatible with the oxide to be reduced. Operational temperatures of the liquefied electrolyte material may range from approximately 400-1200° C., based on the materials used. Oxide material, including, for example, $Nd_2O_3$, $PuO_2$, $UO_2$, complex oxides such as spent oxide nuclear fuel or rare earth ores, etc., is loaded into cathode assemblies 1300, which extend into the liquid electrolyte, such that the oxide material is in contact with the electrolyte and cathode assembly 1300.

The cathode assembly 1300 and anode assembly 1200 are connected to power sources so as to provide opposite charges or polarities, and a current-controlled electrochemical process occurs such that a desired electrochemically-generated reducing potential is established at the cathode by reductant electrons flowing into the metal oxide at the cathode. Because of the generated reducing potential, oxygen in the oxide material within the cathode assemblies 1300 is released and dissolves into the liquid electrolyte as an oxide ion. The reduced metal in the oxide material remains in the cathode assembly 1300. The electrolytic reaction at the cathode assemblies may be represented by equation (1):

$$(\text{Metal Oxide}) + 2e^- \rightarrow (\text{reduced Metal}) + O^{2-} \quad (1)$$

where the $2e^-$ is the current supplied by the cathode assembly 1300.

At the anode assembly 1200, negative oxygen ions dissolved in the electrolyte may transfer their negative charge to the anode assembly 1200 and convert to oxygen gas. The electrolysis reaction at the anode assemblies may be represented by equation (2):

$$2O^{2-} \rightarrow O_2 + 4e^- \quad (2)$$

where the $4e^-$ is the current passing into the anode assembly 1200.

If, for example, a molten Li-based salt is used as the electrolyte, cathode reactions above may be restated by equation (3):

$$(\text{Metal Oxide}) + 2e^- + 2Li^+ \rightarrow (\text{Metal Oxide}) + 2Li \rightarrow (\text{reduced Metal}) + 2Li^+ + O^{2-} \quad (3)$$

However, this specific reaction sequence may not occur, and intermediate electrode reactions are possible, such as if cathode assembly 1300 is maintained at a less negative potential than the one at which lithium deposition will occur. Potential intermediate electrode reactions include those represented by equations (4) and (5):

$$(\text{Metal Oxide}) + xe^- + 2Li^+ \rightarrow Li_x(\text{Metal Oxide}) \quad (4)$$

$$Li_x(\text{Metal Oxide}) + (2-x)e^- + (2-x)Li^+ \rightarrow (\text{reduced Metal}) + 2Li^+ + O^{2-} \quad (5)$$

Incorporation of lithium into the metal oxide crystal structure in the intermediate reactions shown in (4) and (5) may improve conductivity of the metal oxide, favoring reduction.

Reference electrodes and other chemical and electrical monitors may be used to control the electrode potentials and rate of reduction, and thus risk of anode or cathode damage/corrosion/overheating/etc. For example, reference electrodes may be placed near a cathode surface to monitor electrode potential and adjust voltage to anode assemblies 1200 and cathode assemblies 1300. Providing a steady potential sufficient only for reduction may avoid anode reactions such as chlorine evolution and cathode reactions such as free-floating droplets of electrolyte metal such as lithium or calcium.

Efficient transport of dissolved oxide-ion species in a liquid electrolyte, e.g. $Li_2O$ in molten LiCl used as an electrolyte, may improve reduction rate and unoxidized metal production in example embodiment EORS 1000. Alternating anode assemblies 1200 and cathode assemblies 1300 may improve dissolved oxide-ion saturation and evenness throughout the electrolyte, while increasing anode and cathode surface area for larger-scale production. Example embodiment EORS 1000 may further include a stirrer, mixer, vibrator, or the like to enhance diffusional transport of the dissolved oxide-ion species.

Chemical and/or electrical monitoring may indicate that the above-described reducing process has run to completion, such as when a voltage potential between anode assemblies 1200 and cathode assemblies 1300 increases or an amount of dissolved oxide ion decreases. Upon a desired degree of completion, the reduced metal created in the above-discussed reducing process may be harvested from cathode assemblies 1300, by lifting cathode assemblies 1300 containing the retained, reduced metal out of the electrolyte in container 1050. Oxygen gas collected at the anode assemblies during the process 1200 may be periodically or continually swept away by the assemblies and discharged or collected for further use.

Although the structure and operation of example embodiment EORS 1000 has been shown and described above, it is understood that several different components described in the incorporated documents and elsewhere are useable with example embodiments and may describe, in further detail, specific operations and features of EORS 1000. Similarly, components and functionality of example embodiment EORS 1000 is not limited to the specific details given above or in the incorporated documents, but may be varied according to the needs and limitations of those skilled in the art.

Example Embodiment Anode Assemblies

Figure 3:
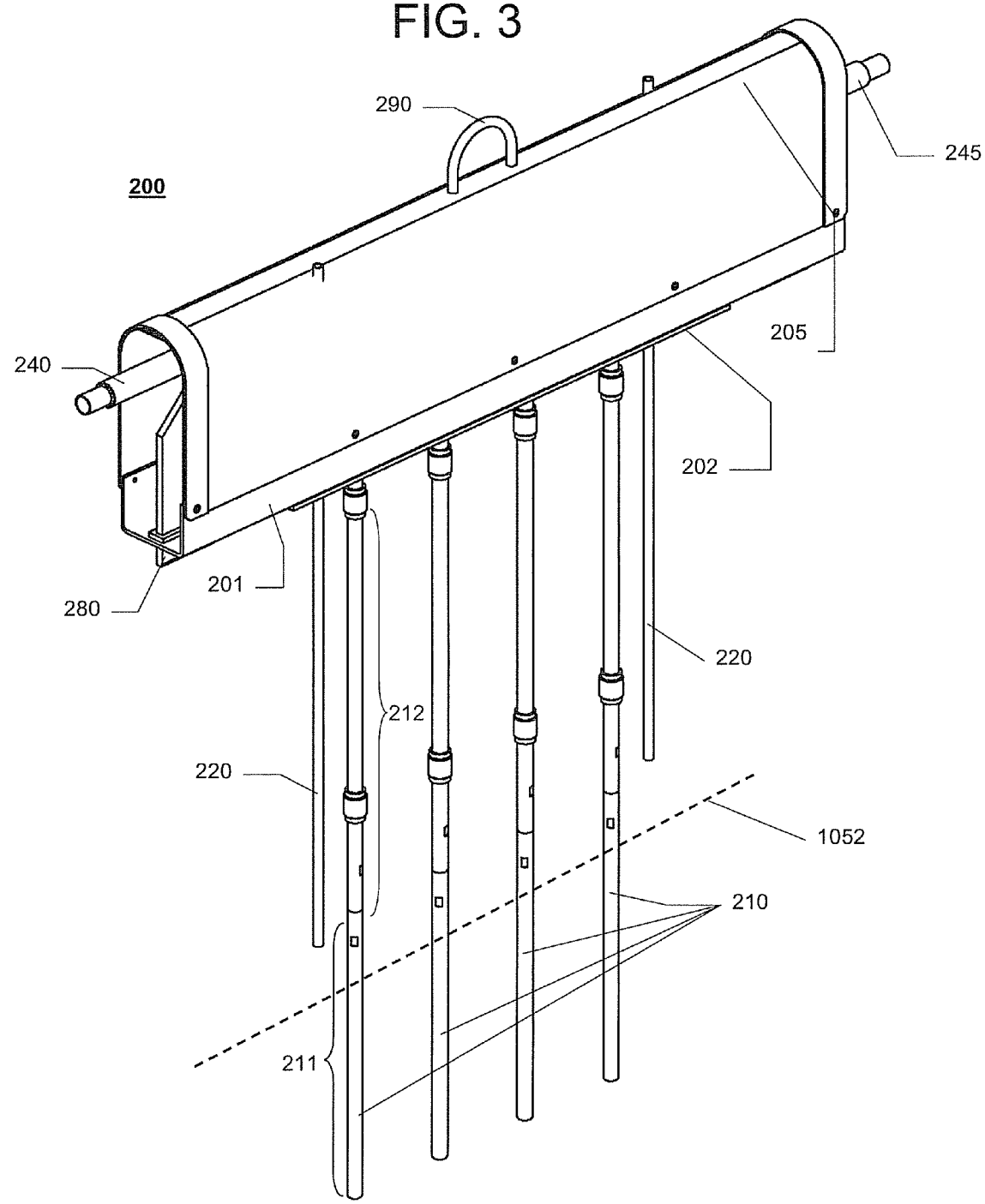
FIG. 3 is an illustration of an example embodiment anode assembly useable in example embodiment systems.

FIG. 3 is an illustration of an example embodiment modular anode assembly 200 useable with example embodiment EORS 1000. For example, modular anode assembly 200 may be useable as anode assemblies 1200 described above in connection with FIG. 1. Example embodiment modular anode assembly 200 may also be useable with other electrolytic systems and components using anodes.

As shown in FIG. 3, example embodiment modular anode assembly 200 includes one or more anode rods 210. Each anode rod 210 may extend downward from channel frame 201 for a sufficient distance to electrically contact an electrolyte below assembly 200. For example, if used in EORS 1000 (FIG. 1), an anode rod 210 will have a length greater than a distance from a bottom of anode assemblies 1200 to a top level 1052 of the electrolyte in electrolyte container 1050. Anode rods 210 may be evenly spaced or clustered along channel frame 201 of example embodiment modular anode assembly 200, depending on where oxidation of oxide ions is desired in an electrolytic oxide reduction system. For example, as shown in FIG. 3, four anode rods 210 may be evenly lined along channel frame 201, so as to present an even current or charge distribution through an electrolyte when placed on either side of a cathode assembly 1300 (FIG. 1). Further, because cathode assemblies 1300 useable with example embodiment EORS 1000 may be planar with increased volume to accommodate larger amounts of metal oxides, anode rods 210 lined substantially evenly along channel frame 201 may evenly remove oxide ions from an electrolyte around the planar cathode assemblies 1300 and/or provide even oxidizing potentials to the same. An example of cathode assemblies that may be alternated with example embodiment anode assemblies in a modular fashion is described in the incorporated document 24AR246139 (8564-000227).

An anode rod 210 may be fabricated of a variety of conductive materials that maintain their physical characteristics when exposed to electrolytic or oxidizing conditions and operating temperatures of several hundred degrees Celsius. For example, any corrosion-resistant metal alloy may be used in anode rod 210. In the example using a high-temperature alkaline-halide salt mixture as the electrolyte, a particularly heat- and corrosion-resistant material, such as platinum, may be used for a lower portion 211 of anode rod 210 that extends below electrolyte surface level 1052. Platinum, iridium, rhodium, and alloys thereof, and other highly noble, conductive materials may equally be used for anode rod 210, or a lower portion 211 thereof. Additionally, sacrificial materials, such as graphite, may be used for anode rod 210, or a lower portion 211 thereof. Sacrificial materials may readily react with oxygen evolved at the anode and/or released from the electrolyte to form less reactive/corrosive gasses, such as carbon dioxide.

In order to reduce cost, an upper portion 212 of anode rod 210 may be fabricated of a more abundant material such as a nickel alloy that is nonetheless electrically conductive and heat- and corrosion-resistant. That is, because upper portion 212 may not contact reactive electrolyte, an inexpensive but comparably resilient material may be used in the upper portion 212, such as stainless steel or nickel, instead of a rarer material such as platinum, iridium or rhodium. Alternatively, or in addition, lower portion 211 may be non-destructively detachable from upper portion 212 to permit material differences between these sections and allow easy replacement and/or repair of lower portion 211, because of, for example, corrosion or other damage caused by high electrolyte operating temperature or electrolysis. Upper portion 212 may removably mate with lower portion 211 through any of several known joining mechanisms such as mechanical fasteners, screw and threaded-hole, tang and receptor, etc.

One or more instrumentation guide tubes 220 may additionally be seated in channel frame 201 or otherwise connected to example embodiment modular anode assembly 200. Instrumentation guide tubes 220 may provide alignment for inserting individual assemblies 200 at fixed positions within a larger system, such as EORS 1000, for example, and may facilitate ready insertion and removal of example embodiment modular anode assemblies 200 from such systems based on need. Instrumentation guide tubes 220 may also house electrical and/or chemical sensors that monitor physical aspects of assembly 200 and systems using the same in order to determine and control reduction potential and completeness. For example, chemical instrumentation measuring oxygen ions in the electrolyte, or an electrode measuring current flow in an anode rod 210, may be placed in instrumentation guide tubes 220 and connected to an exterior output device or processor (not shown) to analyze system parameters and control usage of the same.

Channel frame 201 may include an electrical and/or thermal insulating member 202 attached thereto to lower the operating temperature of channel frame 201 and adjoining components and to prevent current flow outside of example embodiment modular anode assembly 200, such as into a larger EORS system 1000 (FIG. 1). For example, insulating member 202 may cover an entire lower or outer surface of assembly 200, or may be positioned on channel frame 201 only where channel frame 201 would contact an outside support, such as top plate 1108 or around knife-edge contacts of bus 280 (discussed below), or may be positioned where anode rods 210 join to channel frame 201 as shown in FIG. 3. Insulating member 202 may be fabricated of a ceramic or fluorocarbon such as polytetrafluoroethylene or similar to provide desired thermal and/or electrical insulation.

An anode guard 205 may further be joined to channel frame 201 and surround electrical components of example embodiment modular anode assembly 200. Anode guard 205 may insulate and/or prevent accidental contact with energized assembly components during handling of assembly 200. Anode guard 205 may completely shield electrical internals yet permit cooling mechanisms, such as a cooling gas line 240 and/or off-gas line 245 (described below) to extend from and into assembly 200. Anode guard 205 may be fabricated of a material that is insulative and resilient to oxygen corrosion and/or elevated temperatures; such material may be a solid sheet or may be a mesh that permits gasses and heat to flow outside of assembly 200. A lift bail 290 or other handling mechanism may be joined to anode guard 205 or another component of assembly 200 to aid in handling/inserting/removing example embodiment modular anode assemblies 200. In this way, channel frame 201, anode guard 205, and lift bale 290 may provide insulated and safe operating conditions and handling mechanisms to readily move, insert, or remove example embodiment modular anode assemblies 200 in systems permitting flexible anode configurations, such as EORS 1000 (FIG. 1).

Figure 4:
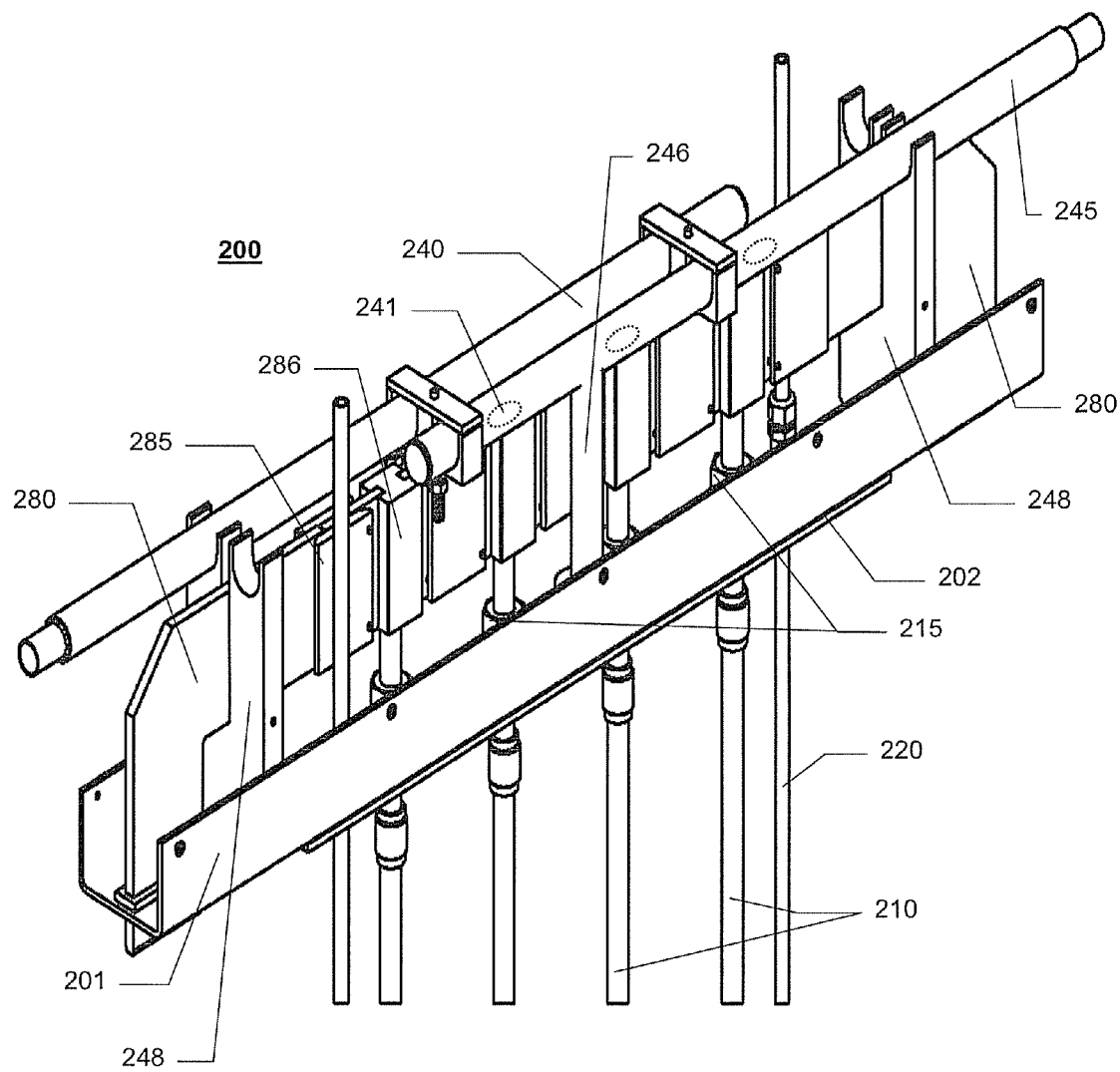
FIG. 4 is an illustration of another example embodiment anode assembly without an anode guard.

FIG. 4 is another illustration of example embodiment anode assembly 200 without anode guard 205 or lift bale 290, showing electrical and cooling internal components useable therein. As shown in FIG. 4, anode rods 210 and/or instrumentation guide tubes 220 may be seated in channel frame 201 by retainers 215. Retainers 215 may securely and removably join channel frame 201 and anode rod 210 in such a way that anode rods 210 are insulated from channel frame 201. For example, retainers 215 may be a ceramic sleeve, nut and screw, a bolt having an insulating liner, etc.

Anode rod 210, regardless of its position or orientation within assembly 200, is electrically powered by an electrical system of example embodiment modular anode assembly 200. For example, an electrical system may include an anode block 286, slip connection 285, and bus 280, that provides current and/or voltage to one or more anode rods 210. In the example shown in FIG. 4, anode rod 210 connects or seats into an insert or hole in anode block 286 so as to maximize surface area contact between anode block 286 and anode rod 210. Anode block 286 is electrically connected through lateral contacts at a slip connection 285 to bus 280. Anode block 286, slip connection 285, and bus 280 may each be insulated from and/or otherwise not electrically connected to channel frame 201 and anode guard 205 (FIG. 3). For example, as shown in FIG. 4, slip connection 285, anode block 286, and bus 280 are each elevated from and separated from channel frame 201. Where these elements contact other charged components, such as anode rods 210 joining to anode block 286 at channel frame 201 or where knife-edge contacts of bus 280 extends through channel frame 201, an insulator may be interposed between the contact and channel frame 201.

Slip connection 285 permits thermal expansion of anode block 286 and/or bus 280 without movement of anode rod 210 or resulting damage. That is, anode block 286 and/or bus 280 may expand and/or contract transversely past each other in slip connection 285, while still remaining in lateral electrical contact. Each component of the example electrical system is fabricated of electrically-conductive material, such as copper or iron alloys and the like. Any number of components may repeat within the electrical system, for example, several anode blocks 286 may be positioned to connect to several corresponding anode rods 210 while still each connecting to plural busses 280 at either end of example embodiment modular anode assembly 200, which may connect to corresponding synchronized voltage sources.

An electrical system guarded by anode guard 205 (FIG. 3) and insulated from channel frame 201 and anode guard 205 (FIG. 3) may be nonetheless connected to an external electrical source. For example, bus 280 may include a knife-edge contact extending through, and insulated from, channel frame 201. The knife-edge contact of bus 280 may seat into a knife-edge receptor in EORS 1000 (FIG. 1) at defined positions where example embodiment modular anode assembly 200 may be placed. Independent electrical current and/or voltage of desired levels may be provided to anode rod 210 through bus 280, slip connection 285, and anode block 286, so that anode rods 210 may provide an oxidizing potential/oxygen de-ionizing function in a reducing system. Voltage and/or current provided by an electrical system in example embodiment assemblies 200 may be varied by an external controller, manually or automated, based on physical parameters of a system and feedback from instrumentation, which may also be provided by example embodiment anode assembly 200. Alternatively, electrical systems in example embodiment modular anode assemblies may be self-contained and powered by internal high-capacity electrical storage, without the need for external contacts.

Example embodiment modular anode assembly 200 may further include a coolant system that aids in maintaining electrical components and other assembly structures at an operating temperature that enhances material stability, electrical conductance, and safety. For example, aside from lower portion 211 (FIG. 3) of anode rods 210 directly contacting potentially molten halide salts, an operating temperature of example embodiment modular anode assemblies 200 above top plate 1108 may be maintained at approximately 150° C. or lower. Insulating member 202 may additionally contribute to a lower operating temperature.

Coolant systems may include, for example, an active gas cooling line 240 and a gas outlet line 245 connected and/or venting to example embodiment modular anode assembly 200. As shown in FIG. 4, lines 240 and 245 may enter assembly 200 from a side or both sides and extend along each anode block 286 within anode guard 205 (FIG. 3). Lines 240 and 245 may connect to corresponding gas sources and drains included in or independent from a modular system such as EORS 1000 (FIG. 1). Gas outlet line 245 and active gas cooling line 240 may be mutually or individually supported by line support 248 secured to channel frame 201 and insulated from an electrical system. Active gas cooling line 240 may include one or more weep holes 241 that blow a coolant gas directly onto an anode block 286 or other component desired to be actively cooled. Because anode block 286 may connect to anode rod 210 within a higher-temperature electrolyte, anode block 286 may be a hottest or most effectively cooled component in example embodiment modular anode assembly 200. Additionally or in the alternative, active gas cooling line 240 may vent or blow coolant gas onto a variety of structures and/or generally cool an interior of anode guard 205 (FIG. 3). Of course, closed channel and compressor/refrigerant-based coolant systems, or systems using multiple coolant lines 240, etc. may be looped through example embodiment modular anode assemblies and provide desired cooling.

The active coolant gas may be a cooled, inert gas such as argon, helium, etc. that convectively removes heat from example embodiment modular anode assembly 200. The active coolant gas may additionally mix with oxygen or any other off-gas devolved from the electrolyte or material to be reduced in reduction systems and may flow into or gather in example embodiment modular anode assembly 200. The mixing may both cool and reduce the corrosiveness of hot off-gasses; for example, cooled neon mixing with hot, potentially ionized, gaseous oxygen will, by dilution, reduce the temperature and corrosiveness of such oxygen without further reaction.

Active coolant gas and any intermixed off-gas may be swept into gas outlet line 245 for venting or further use. Gas outlet line 245 may have holes, vents, filters, etc. and be connected to an external fan or chiller that provides a relatively lower pressure in gas outlet line 245, such that gasses in example embodiment anode assembly 200, particularly coolant and off-gasses collecting under anode guard 205 (FIG. 3) will be swept into gas outlet line 245. Gas outlet line 245 may further include a shroud vent line 246 connecting thereto. A shroud collecting and concentrating oxygen and/or other off-gasses from a reduction system may connect to example embodiment anode assembly 200 and feed such gasses directly into gas outlet line 245 through shroud vent line 246. The off-gasses from such a shroud may mix and be cooled with the inert coolant gas being swept into gas outlet line 245 for safe handling and reduced corrosion. An example of a shroud assembly joinable to example embodiment modular anode assembly 200 is described in the incorporated 24AR246135 (8564-000224) application.

Gas lines 240 and 245 may be easily and non-destructively connected and disconnected to respective coolant gas sources or pressure sinks where example embodiment modular anode assembly 200 is positioned in a reducing system, such as EORS 1000 (FIG. 1) or another system. For example, reducing systems may include a glovebox manifold that may connect, via a fastener, screw, pipe fitting, etc., to gas outlet line 245 and pull off-gas and used coolant gas into the glovebox for isolation and handling.

As shown in FIG. 1, example embodiment modular anode assemblies 200 are useable as anode assemblies 1200 and may be standardized and used in interchangeable combination, in numbers based on oxidizing need. For example, if each modular anode assembly 200 includes similarly-configured busses 280 with knife-edge contacts and outlets for gas lines 240 and 245, any modular anode assembly 200 may be replaced with another or moved to other correspondingly-configured locations in a reducing system, such as EORS 1000. Each anode assembly may be powered and placed in a proximity, such as alternately, with a cathode assembly to provide a desired and efficient reducing action to metal oxides in the cathodes. Such flexibility may permit large amounts of reduced metal to be formed in predictable, even amounts with controlled resource consumption and reduced system complexity and/or damage risk in example embodiment systems using example embodiment modular anode assemblies 200.

Example embodiments discussed above may be used in unique reduction processes and methods in connection with example systems and anode assembly embodiments. Example methods include determining a position or configuration of one or more modular anode assemblies within a reduction system. Such determination may be based on an amount of material to be reduced, desired operating power levels or temperatures, cathode assembly positions, and/or any other set or desired operating parameter of the system. Example methods may further connect anode assemblies to a power source and an optional gas source/drain, such as a glovebox where the assemblies are placed. Because example assemblies are modular, external connections may be made uniform as well, and a single type of connection may work with all example embodiment anode assemblies. An electrolyte used in reduction systems may be made molten or fluid in order to position anode and/or cathode assemblies at the determined positions in contact with the electrolyte.

A desired power level, measured in either current or voltage, is applied to anode assemblies through an electrical system in the assemblies so as to charge anode rods therein in example methods. This charging, while the anode rods are contacted with an electrolyte, reduces a metal oxide in nearby cathodes or in contact with the same in the electrolyte, while de-ionizing oxygen dissolved into the electrolyte. Example methods may further swap modular parts of assemblies or entire assemblies within reduction systems based on repair or system configuration needs, providing a flexible system that can produce variable amounts of reduced metal and/or be operated at desired power levels, electrolyte temperatures, and/or any other system parameter based on modular configuration. Following reduction, the reduced metal may be removed and used in a variety of chemical processes based on the identity of the reduced metal. For example, reduced uranium metal may be reprocessed into nuclear fuel.

Example embodiments thus being described, it will be appreciated by one skilled in the art that example embodiments may be varied through routine experimentation and without further inventive activity. For example, although four anode rods are shown in example embodiments, it is of course understood that other numbers and configurations of anode rods may be used based on expected anode assembly placement, power level, necessary anodizing potential, etc. Variations are not to be regarded as departure from the spirit and scope of the example embodiments, and all such modifications as would be obvious to one skilled in the art are intended to be included within the scope of the following claims.

What is claimed is:

1. A modular anode assembly, comprising:
a channel frame supporting the modular anode assembly;
at least one anode rod extending from and electrically insulated from the channel frame, the anode rod being electrically conductive in an electrolyte;
an electrical system insulated from the channel frame and providing electrical power to the anode rod, the electrical system including an anode block into which the anode rod seats and is electrically connected and a bus providing electrical power to the anode block; and
a cooling system configured to remove heat from the anode rod and the electrical system.

2. The assembly of claim 1, further comprising:
an anode guard joining to the channel frame and enclosing the electrical system so as to prevent external contact to the electrical system.

3. The assembly of claim 2, wherein the anode guard includes a handle, wherein the anode guard further encloses the cooling system, and wherein the cooling system and the electrical system include access points outside of the anode guard.

4. The assembly of claim 1, wherein the channel frame has a length so as to support the assembly within a frame, and wherein the at least one anode rod includes at least four anode rods distributed evenly along the length of the channel frame.

5. The assembly of claim 1, wherein the anode rod includes an upper section joining the channel frame, and wherein the anode rod includes a lower section configured to electrically contact the electrolyte and removably mating to the upper section of the anode rod.

6. The assembly of claim 5, wherein the upper section is fabricated of a nickel alloy, and wherein the lower section includes platinum.

7. The assembly of claim 1, wherein the electrical system further includes a slip joint electrically coupling the anode block to the bus.

8. The assembly of claim 7, wherein two busses provide equal electrical power to a plurality of the anode blocks into which each of a plurality of the anode rods seat, and wherein the two busses each include a knife-edge contact extending outside of the channel frame so as to provide the electrical power from an outside source.

9. The assembly of claim 7, wherein the slip joint includes a plurality of lateral members moveable in a first direction with respect to each other lateral member while remaining in electrical contact with at least one other lateral member in a second direction.

10. The assembly of claim 1, wherein the cooling system includes an active gas cooling line configured to blow coolant gas on the electrical system, and a gas outlet line configured to collect and remove the coolant gas and off-gas from the assembly.

11. An electrolytic oxide reduction system, comprising:
an electrolyte container containing an electrolyte;
at least one modular cathode assembly supported above the electrolyte container and extending into the electrolyte; and
a plurality of modular anode assemblies on either side of the modular cathode assembly, the modular anode assemblies each including,
a channel frame supporting the modular anode assembly above the electrolyte container,
at least one anode rod extending into the electrolyte in the electrolyte container, wherein the at least one anode rod extends from and is electrically insulated from the channel frame,
an electrical system insulated from the channel frame and providing electrical power to the anode rod, the electrical system including an anode block into which the anode rod seats and is electrically connected and a bus providing electrical power to the anode block, and a cooling system configured to remove heat from the anode rod and the electrical system.

12. The system of claim 11, wherein the plurality of modular anode assemblies each further include an anode guard, wherein the anode guard further encloses the electrical system and the cooling system, and wherein the cooling system and the electrical system include access points outside of the anode guard.

13. The system of claim 11, wherein the channel frame has a length so as to support the modular assembly above the electrolyte container, wherein the at least one anode rod includes four anode rods distributed evenly along the length of the channel frame, and wherein the four anode rods supply a substantially even oxidizing potential to an adjacent modular cathode assembly.

14. The system of claim 11, wherein the electrical system includes,
two busses providing electrical power to the anode block, the two busses each including a knife-edge contact extending outside of the channel frame so as to connect to knife-edge receivers in the electrolytic oxide reduction system, and
two slip joints electrically coupling the anode block to the two busses.

15. The system of claim 11, wherein the cooling system includes an active gas cooling line configured to blow coolant gas on the electrical system, and a gas outlet line configured to collect and remove the coolant gas and off-gas from the assembly, wherein the active gas cooling line removably connects to a cooling gas source, and wherein the gas outlet line removably connects to a glovebox.

16. A method of operating an electrolytic oxide reduction system, the method comprising:
positioning a plurality of modular anode assemblies in the reduction system, each modular anode assembly including,
a channel frame supporting the modular anode assembly above an electrolyte,
at least one anode rod extending into the electrolyte, wherein the at least one anode rod extends from and is electrically insulated from the channel frame,
an electrical system insulated from the channel frame and providing electrical power to the anode rod, the electrical system including an anode block into which the anode rod seats and is electrically connected and a bus providing electrical power to the anode block, and a cooling system configured to remove heat from the anode rod and the electrical system;

applying electrical power to the plurality of anode assemblies through the electrical system in the assemblies so as to charge the anode rods; and reducing a metal oxide by contacting a cathode with the metal oxide to electrolyte.

17. The method of claim 16, further comprising:
fluidizing the electrolyte so that the anode rod in each of the modular anode rod assemblies extends into the electrolyte.

18. The method of claim 16, wherein the method further comprises:
connecting the plurality of modular anode assemblies to a power source via the electrical system and to a gas source and a gas drain via the cooling system;
flowing a coolant gas through the cooling system into the assembly; and
removing the coolant gas and an off-gas through the cooling system.

19. The method of claim 16, further comprising:
removing the coolant gas and an off-gas through the cooling system.

20. The method of claim 16, wherein the anode rod includes an upper section joining the channel frame, wherein the anode rod includes a lower section configured to electrically contact the electrolyte and removably mating to the upper section of the anode rod, and wherein the method further comprises:
removing the lower section of the anode rod and replacing the lower section of the anode rod with a replacement lower section.

* * * * *